United States Patent [19]

Lucia et al.

[11] Patent Number: 4,520,659
[45] Date of Patent: Jun. 4, 1985

[54] TRANSMISSION TESTER

[76] Inventors: Carroll J. Lucia, 2703 Bay Settlement Rd., Green Bay, Wis. 54301; George C. Lucia, 214 N. Superior St., DePere, Wis. 54115

[21] Appl. No.: 493,301

[22] Filed: May 10, 1983

[51] Int. Cl.³ ............................................. G01M 15/00
[52] U.S. Cl. ......................................................... 73/118
[58] Field of Search ............. 73/118, 116, 862, 862.09, 73/862.28

[56] References Cited

U.S. PATENT DOCUMENTS

| | | | |
|---|---|---|---|
| 3,075,381 | 1/1963 | Lelis | 73/118 |
| 4,391,131 | 7/1983 | Scourtes | 73/118 |

*Primary Examiner*—Jerry W. Myracle
*Attorney, Agent, or Firm*—Hauke and Patalidis

[57] ABSTRACT

A transmission testing apparatus having at least one inertia flywheel having a shaft capable of being coupled to the output shaft of the transmission being tested. The transmission is mounted on a removable plate on an adjustable bulkhead supporting a prime mover, such as an internal combustion engine, and having an output shaft coupled to the input shaft of the transmission. The bulkhead is adjustably positionable such as to align the transmission output shaft with the inertia flywheel shaft. Alternatively, the apparatus comprises two upright members each provided with a shaft driven inertia flywheel such that each of the output shafts of a transaxle transmission may be coupled each to one of the two inertia flywheels.

27 Claims, 8 Drawing Figures

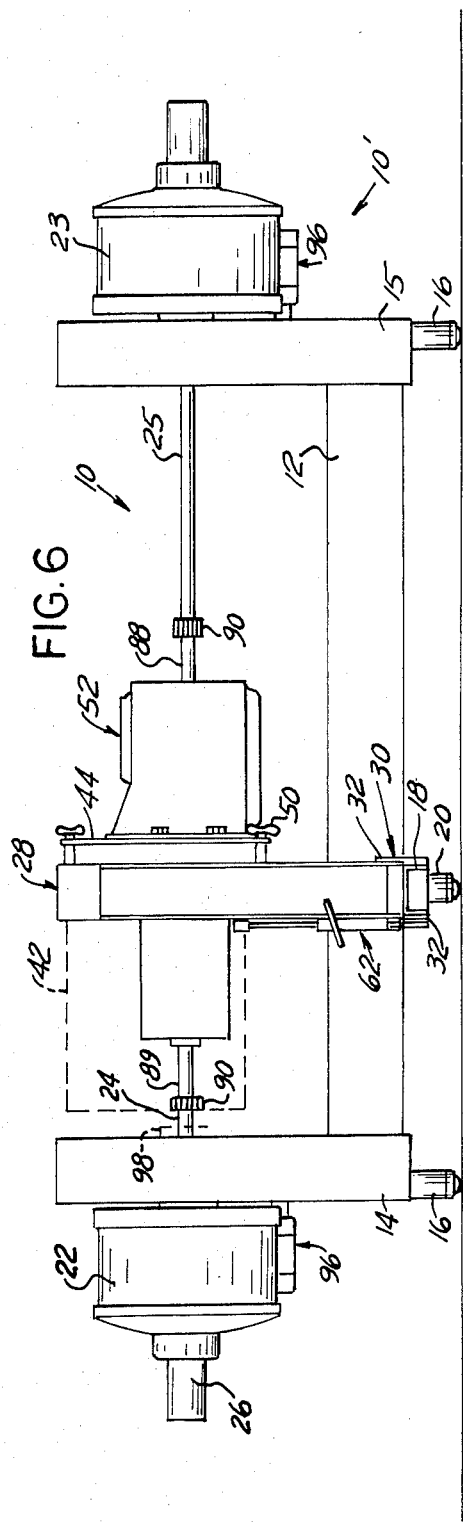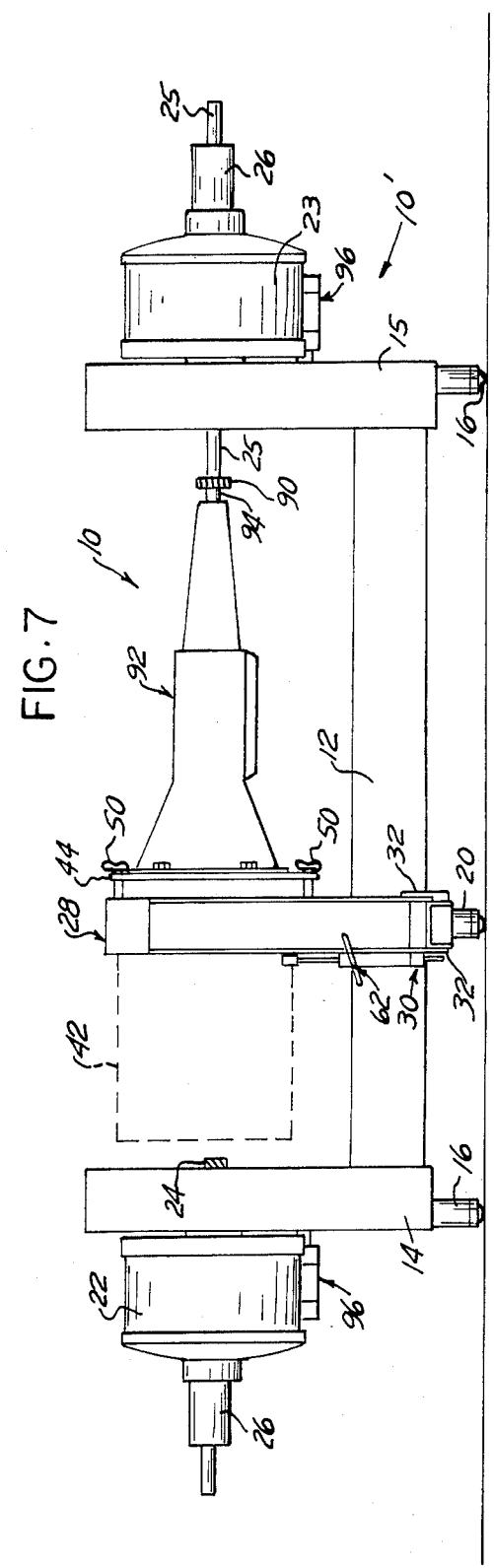

TRANSMISSION TESTER

BACKGROUND OF THE INVENTION

The present invention belongs to the field of prime mover tester apparatus and methods, in general, and more particularly to motor vehicle automatic transmission testers.

It is common practice to test factory assembled transmissions before installation in motor vehicles. However, although it would be desirable to also test transmissions repaired in service shops and garages, and transmissions rebuilt by transmission rebuilters, test stands for testing repaired or rebuilt transmissions are not generally available in view of the high cost of such testing equipment, and more particularly of highly instrumented testing equipment of the dynamometer or brake type. Dynamometers and like apparatus are costly and delicate, often difficult to maintain in good operating condition, and they require substantially skilled personnel for proper operation, interpretation of test data, and maintenance.

Applicant has in the past developed testing equipment for prime movers, such as internal combustion engines, and automotive transmissions, as disclosed in U.S. Pat. Nos. 3,060,730, 3,505,863 and 3,592,053, utilizing the simple principle of coupling the prime mover or transmission output to a flywheel of known inertia which is driven and accelerated to a predetermined velocity. When used for testing an automatic transmission, for example, during acceleration the torque performance of the transmission output can be determined, and proper shifting of gears from low to high gear simulated as would be the case with the transmission being used in a motor vehicle during acceleration. During deceleration, the energy stored in the flywheel is used to drive the prime mover through the transmission as would be the case in actual use on the road, such as to provide appropriate testing of the downshift operation of the transmission from high speed to complete stop.

With the recent advent of front-wheel drive motor vehicles utilizing a transaxle type of transmission, additional problems have been brought to light in view of the structural arrangement of such transaxle transmissions having an input shaft and two output shafts, each driving one of the front wheels of the motor vehicle, as compared to "conventional" automatic transmissions, of the type used for rear-wheel drive motor vehicles, which are provided with an input shaft and a single output shaft, generally aligned along a common centerline or having substantially parallel centerlines. Testing of transaxle transmissions by way of the inertia flywheel technique on a universal test stand requires that means be provided for aligning the input shaft of the transmission with a prime mover, such as an electric motor or preferably an internal combustion engine permanently mounted on the test stand, and for aligning each of the output shafts with one of the inertia flywheel shafts for coupling to the inertia flywheel shafts. Because there is a multitude of different mounts for transaxle transmissions of different makes and models, the problem of proper shaft alignment is further complicated.

SUMMARY OF THE INVENTION

The present invention provides a test stand for automatic transmissions, more particularly permitting alignment of the transmission input shaft and output shafts respectively with the prime mover output shaft and with the energy absorbing shafts on the test stand, in a simple and precise manner. In addition, the present invention, in one of its aspects, provides a universal type of transmission testing stand capable of accepting for test straight-through transmissions as well as transaxle transmissions.

The many objects and advantages of the present invention will become apparent to those skilled in the art when the following description of the best modes for practicing the invention is read in conjunction with the accompanying drawings wherein like reference numerals refer to like or equivalent parts and in which:

BRIEF DESCRIPTION OF THE DRAWINGS

FIG. 6 is a schematic front elevation view of the modification of FIG. 5 as seen from line 6—6 of FIG. 5;

FIG. 7 is a view similar to FIG. 6, and showing the apparatus in use for testing a motor vehicle rear wheel drive automatic transmission.

DETAILED DESCRIPTION OF THE PREFERRED EMBODIMENTS

Figure 1:
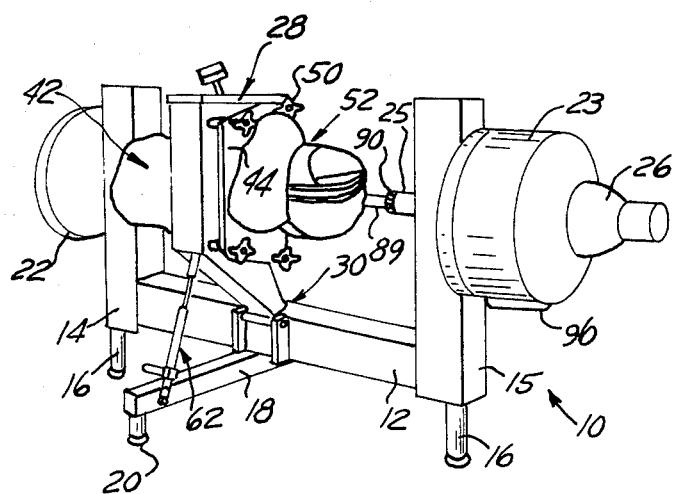
FIG. 1 is a perspective front view of an automatic transmission test apparatus according to the present invention, particularly suitable for testing transaxle transmissions.
Figure 2:
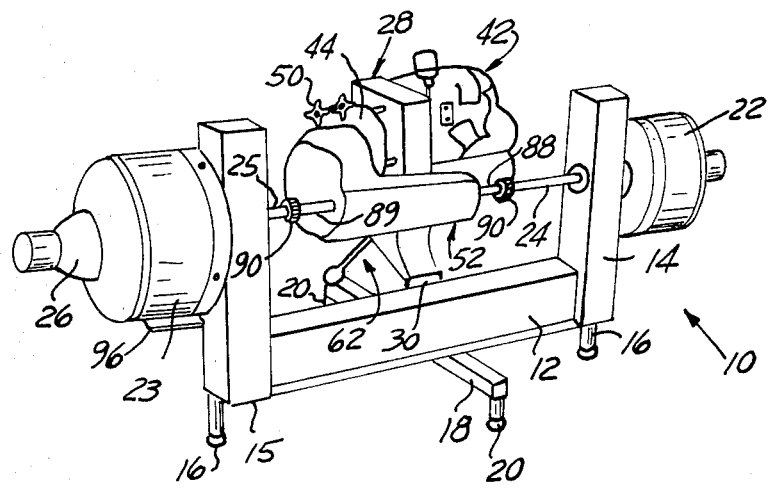
FIG. 2 is a rear perspective view thereof.

Referring now to the drawing, and more particularly to FIGS. 1 and 2, a transaxle transmission testing apparatus 10 according to the present invention comprises a rigid support structure consisting of a longitudinally extending closed channel frame member 12 provided at each end with an upright post, 14 and 15, and with a height adjustable ground supporting foot 16. A transversely extending beam or leg 18 is fastened to the longitudinal frame member 12, such as by being welded or bolted below the longitudinal frame member 12. The transverse beam or leg 18 is provided at each end with a height adjustable foot 20. Each of the feet 16 and 20 has a pad made of elastomeric material such as rubber in engagement with the ground for the purpose of absorbing vibration.

Each of the uprights 14 and 15 supports an inertia flywheel, 22 and 23 respectively, on the end of a shaft, 24 and 25 respectively, the shaft 24 being journalled through the upright member 14 and the shaft 25 being journalled through the upright member 15. The shafts 24 and 25 are adjustable longitudinally and are coupled to the flywheels 22 and 23 by a conventional spline and longitudinal groove coupling, not shown, the portion of the shaft 24 or 25 projecting beyond its appropriate flywheel being protected by a cover as shown at 26.

Figure 3:
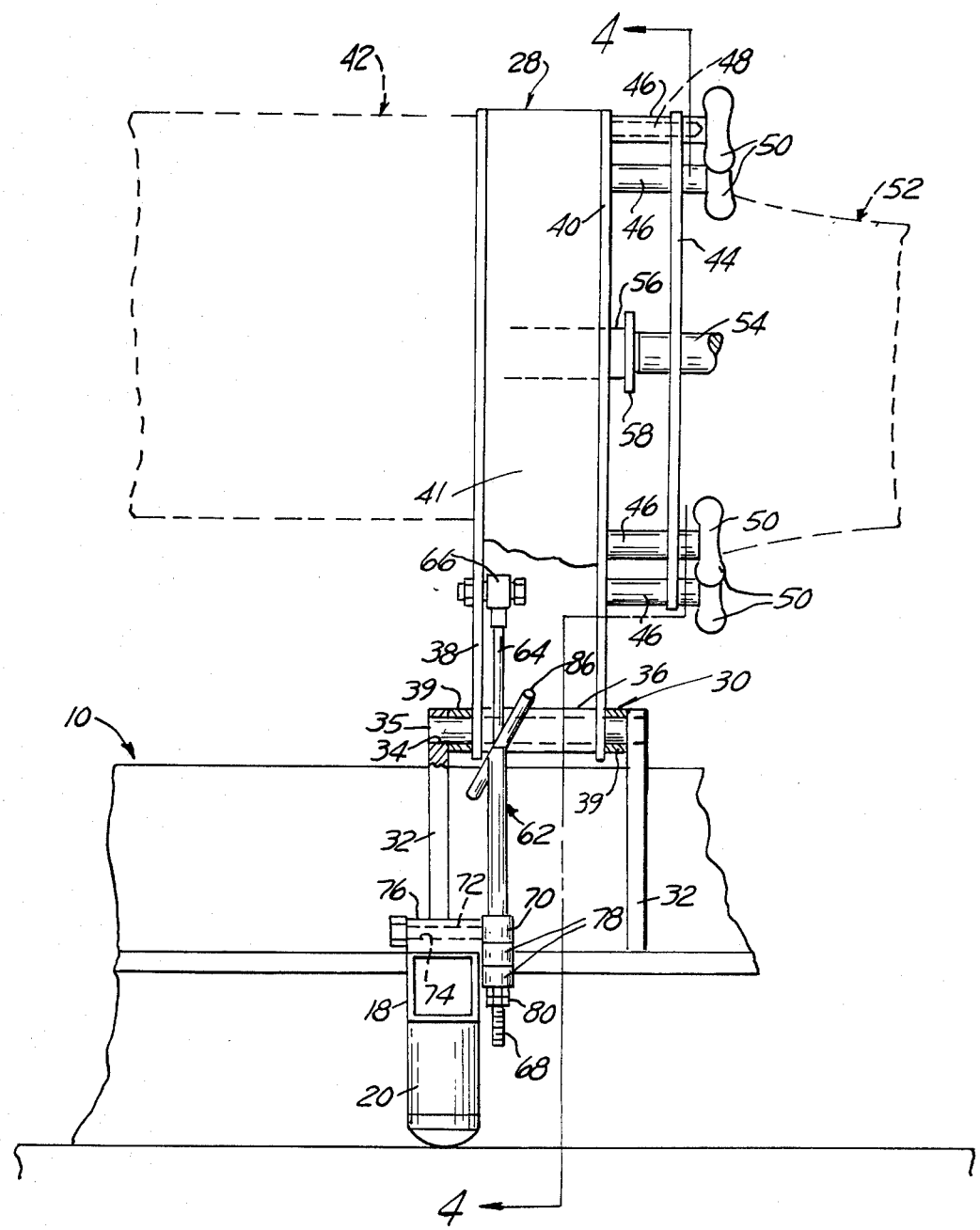
FIG. 3 is a partial front elevation view thereof.
Figure 4:
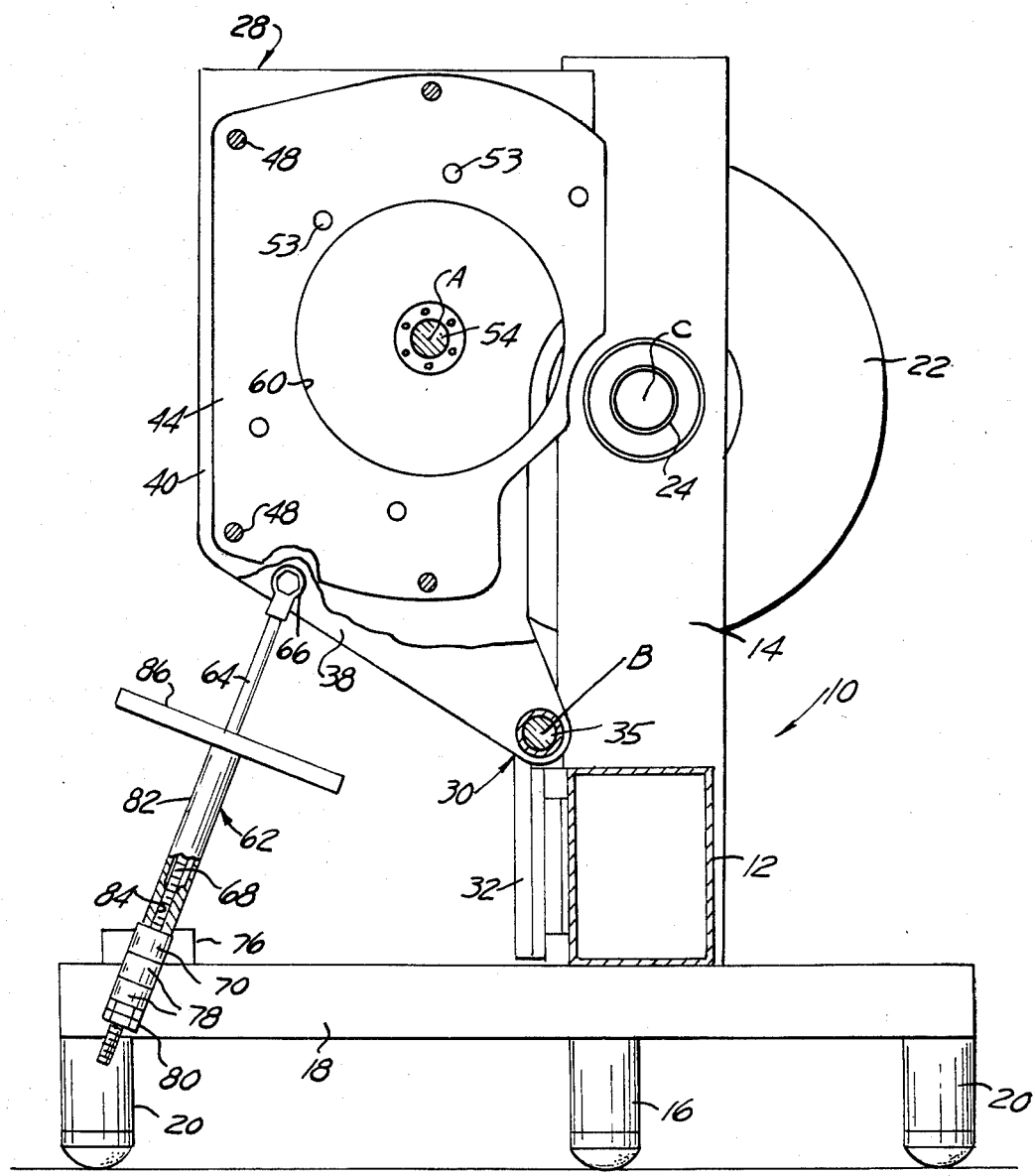
FIG. 4 is a section generally along line 4—4 of FIG. 3, with some portions broken away.

An adjustable bulkhead or tailstock 28 is pivotably mounted transversely relative to the frame longitudinal member 12 between the uprights 14 and 15, as shown at 30. The pivot means 30 comprises, for example and as best shown at FIGS. 3–4, a pair of vertical bracket members 32 attached, such as by welding, to a side of the frame longitudinal beam member 12, each of the bracket members 32 being provided with a bore 34, through which is fitted each end of a pin 35 passed through a tubular spacer 36 disposed between a pair of parallel end plates 38 and 40 forming the bulkhead or tailstock 28, spacers 39 being disposed around the pin 35 between one bracket member 32 and each of the end plates 38 and 40. The end plates 38 and 40 of the bulkhead or tailstock 28 are interconnected by welded-on plates 41 such as to form a sturdy and rigid structure.

A prime mover, for example an internal combustion engine 42 is bolted on the end plate 38 of the bulkhead or tailstock 28. A transaxle transmission support plate 44 is mounted spaced apart from the tailstock end plate 40 by means of sleeve spacers 46 through each of which is passed a threaded stud 48, a wing nut 50 being used in co-operation with each threaded stud 48 for clamping the transmission support plate 44 in position. The transmission support plate 44, FIG. 4, is provided with a plurality of mounting holes 53, to accommodate mounting thereon any one of a plurality of types and models of transaxle transmissions 52. Alternatively, a predetermined mounting or support plate 44 may be provided for each particular type and model of transaxle transmission, such that, once a transmission 52 is mounted on the support plate 44, the transmission input shaft 54, FIG. 3, is aligned with the output shaft 56 of the internal combustion engine 42, for coupling thereto by means of a coupling 58. The transmission shaft 54 projects through an opening 60 in the support plate 44, FIG. 4, a similar opening, not shown, being provided in both the engine support plate 38 and the end plate 40 of the bulkhead or tailstock 28 providing clearance around the internal combustion output shaft 56, the common centerline of the internal combustion engine output shaft 56 and of the transmission input shaft 54 being designated at A at FIG. 4.

The tailstock or bulkhead 28, pivotably supported by the pivot means 30, is further adjustably supported by means of a strut member 62. The strut member 62 comprises a rod 64 pivotally attached at one end, as shown at 66, to the bulkhead or tailstock 28. The strut member rod 64 has a threaded end 68, FIGS. 3 and 4, attached through a socket 70 mounted on the end of a pin 72 passed through a bore 74 in a block 76 fastened, such as by welding for example, at the end of the transverse frame support member or leg 18 proximate the foot 20. One or more tubular spacers 78 are disposed around the threaded end of the rod 64 below the socket 70, to coarsely determine the distance between the socket 70 and the rod end pivot 66 where it is attached to the bulkhead or tailstock 28. A pair of fine adjusting nuts 80 are disposed on the threaded end 68 of the rod 64, while a sleeve 82 having an internally threaded end portion 84 is threadably disposed above the socket 70 in threading engagement with the threaded portion 68 of the rod 64. The internally threaded sleeve 82 is provided with a bar 86 such as to clamp the strut member 62 in any appropriate length as provided by the adjusting nuts 80 and the spacers 78, resulting in appropriately adjusting the position of the bulkhead or tailstock 28 around the pivot pin 35, the centerline of pivoting of the bulkhead or tailstock 28 being shown at B at FIG. 4.

By making the bulkhead or tailstock 28 pivotably adjustable around the axis B of the support pin 35, the symmetrically aligned output shafts 88 and 89, FIGS. 1 and 2, of the transaxle transmission 52 may be adjustably aligned with the inertia flywheel shafts 22 and 23 such as to be coupled therewith by means of appropriate couplings 90. During pivotable adjustment of the position of the bulkhead or tailstock 28, the centerline A of the transmission input shaft 54 is adjustably displaced relative to the pivot axis B on a circle of a radius AB, FIG. 4, while the aligned output shafts 88 and 89 of the transmission are displaced along a circle of radius BC, such that by appropriate positioning of the mounting holes 53 in the transmission support plate 44 the output shafts 88 and 89 of the transaxle transmission 52 may be perfectly aligned with the shafts 24 and 25 of the flywheels 22 and 23, for appropriate test of the transmission through driving by the internal combustion engine 42 during acceleration and deceleration runs.

Figure 5:
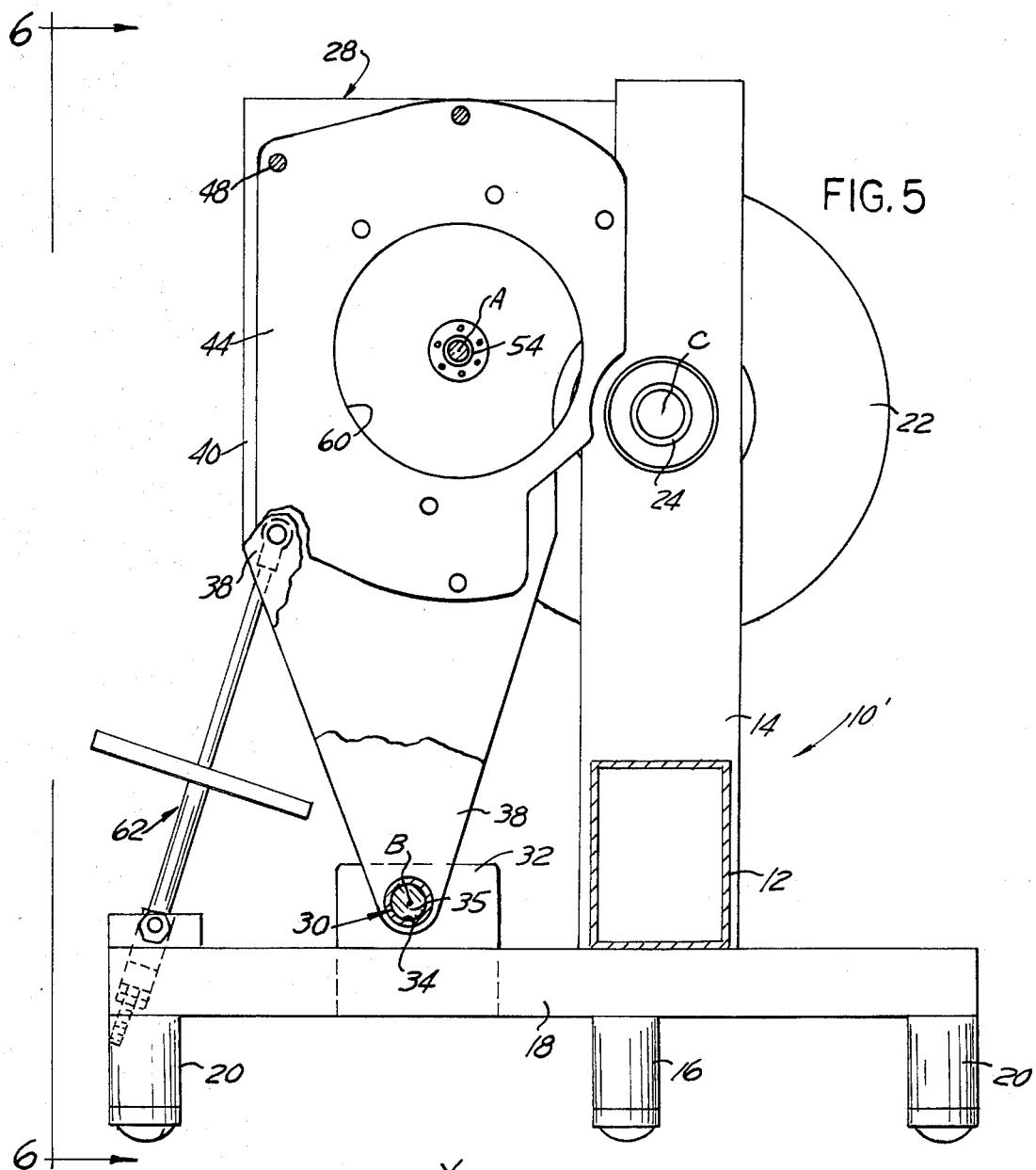
FIG. 5 is a view similar to FIG. 4, but showing a modification thereof.

It is advantageous to make the radius or distance AB equal to the fixed distance BC, as shown at FIG. 5, by affixing the bracket members 32 of the pivot means 30 of the bulkhead or tailstock 28 to the transverse leg member 18. With such an arrangement, not only the distance separating the common axis A of the prime mover output shaft and transmission input shaft from the axis C may be varied at will to align the output shafts 88 and 89 of a transaxle transmission 52 with the shafts 24 and 25 of the flywheels 22 and 23, FIGS. 1–4 and 6, but the centerline or common axis A may be made to coincide with the centerline or axis C of the shafts 24 and 25 of the flywheels 22 and 23, with the result that the apparatus 10' of FIGS. 5–7 is capable of universal use, namely capable of testing a transaxle transmission 52, FIG. 6, and a conventional transmission 92, FIG. 7, having input and output shafts aligned. For testing automatic transmissions having its input shaft and its output shaft out of alignment, an arrangement such as shown at FIGS. 1–4 may be used, as will be apparent to those skilled in the art.

FIG. 7 typically illustrates the modified apparatus of the invention in use for testing a conventional automatic transmission 92 such as used for transmitting power from the internal combustion engine 42 to the rear wheel of a rear-wheel drive motor vehicle. It can be seen that the shaft 25 of the flywheel 23 to which is connected the output shaft 94 of the automatic transmission 92 through the coupling 90 has been slid forwardly outwardly of the housing cap or cover 26 of the flywheel 23, such as to accommodate the length of the housing of the transmission 92, and that the flywheel 23, when testing a rear-wheel drive automatic transmission 92, is not used.

it is also possible to test a transaxle transmission by using a single inertia flywheel. This is accomplished by holding stationary one of the transaxle output shafts. The inertia flywheel coupled to the transaxle transmission other output shaft is driven at twice the normal rotational speed through the differential in the transaxle transmission housing. In the example illustrated at FIG. 6, for example, the transaxle transmission output shaft 88 coupled to the shaft 24 of the flywheel 22 may be held stationary either by holding the flywheel 22 stationary by means of the flywheel brake 96, or by any other convenient means such as by replacing the journal bearing supporting the shaft 24 through the upright posts 14 by a plate or bushing, as shown at 98 in dotted line, bolted to the upright 14 and provided with a splined bore accepting the shaft 24, such as to hold the shaft 24 in a stationary position. In such a structure, the flywheel 22 may be omitted altogether.

Figure 8:
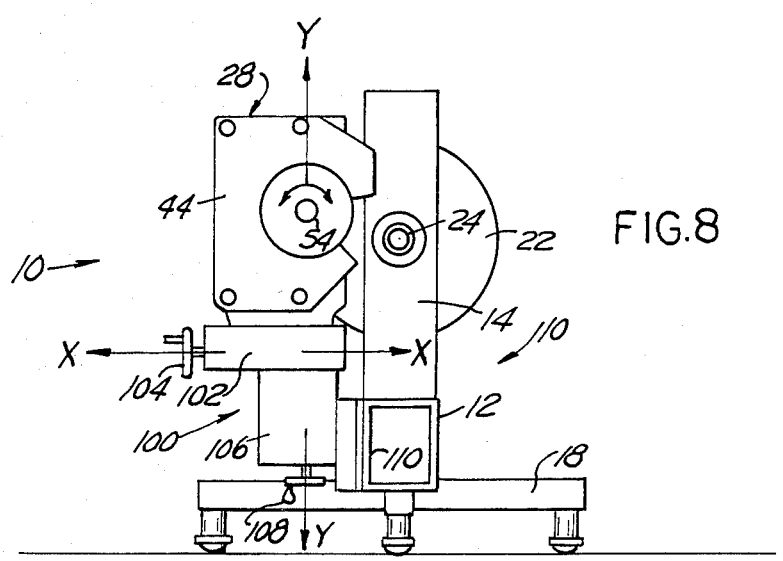
FIG. 8 is a view similar to FIGS. 4 and 5, but showing a further modification of the invention.

Instead of using a pivoting arrangement for displacement of the bulkhead or tailstock 28 supporting on one side the prime mover in the form of an internal combustion engine 42 and a transmission on the other side, such as a transaxle transmission 52, a cross-slide table 100, FIG. 8, may be used for supporting the bulkhead or tailstock 28. The cross-slide table 100 provides displacement of the bulkhead or tailstock 28 along a horizontal, or X-axis, by means of a horizontal slide 102 actuated by a hand-crank 104, and vertical displacement along a vertical, or Y-axis, by means of a vertical slide 106 displaced by a hand-crank 108 relative to a support base 110. The support base 110 of the cross-slide table 100 is bolted, for example, to the side of the apparatus longitudinal frame member 12. It will therefore be readily apparent to one skilled in the art that by way of the cross-slide table 100, and by way of any other appropriate means permitting to displace the bulkhead or tailstock 28 along two perpendicular axes, appropriate alignment of transaxle output shafts with the flywheel shafts may be effected.

Having thus described the invention by way of example of structures well adapted for practicing the invention, what is claimed as new is as follows:

1. A transmission testing apparatus comprising a frame member, at least one upright member disposed at an end of said, said upright member having a shaft journalled therethrough and an inertia flywheel supported by said shaft for rotation thereby, an adjustably positionable bulkhead, a prime mover mounted on one side of said bulkhead, said prime mover having an output shaft, a transmission support plate removably attached to said bulkhead and having mounting apertures for affixing thereto a transmission to be tested, said transmission having an input shaft aligned with said prime mover output shaft for coupling to said prime mover output shaft and an output shaft, means for displaceably and adjustably supporting said bulkhead relative to said frame member for aligning said transmission output shaft with said inertia flywheel shaft, and means for coupling said transmission output shaft to said inertia flywheel shaft.

2. The apparatus of claim 1 further comprising a second upright member disposed at the other end of said frame member, said prime mover being mounted on said bulkhead between said bulkhead and said second upright member, a second shaft projecting from said second upright member, said second shaft being aligned with said inertia flywheel shaft, and means for coupling said second shaft to a second output shaft of said transmission.

3. The apparatus of claim 2 wherein said second shaft projecting from said second upright member is held stationary.

4. The apparatus of claim 3 wherein said means for adjustably positioning said bulkhead comprises a cross-slide table.

5. The apparatus of claim 3 wherein said means for adjustably positioning said bulkhead comprises pivot support means for said bulkhead, and a variable length strut member for pivotably and adjustably positioning said bulkhead.

6. The apparatus of claim 2 wherein said second shaft projecting from said second upright member is rotatable, and further comprising a second inertia flywheel mounted on said second shaft.

7. The apparatus of claim 6 wherein said means for adjustably positioning said bulkhead comprises a cross-slide table.

8. The apparatus of claim 6 wherein said means for adjustably positioning said bulkhead comprises pivot support means for said bulkhead, and a variable length strut member for pivotably and adjustably positioning said bulkhead.

9. The apparatus of claim 2 wherein said means for adjustably positioning said bulkhead comprises a cross-slide table.

10. The apparatus of claim 2 wherein said means for adjustably positioning said bulkhead comprises pivot support means for said bulkhead, and a variable length strut member for pivotably and adjustably positioning said bulkhead.

11. The apparatus of claim 1 wherein said means for adjustably positioning said bulkhead comprises a cross-slide table.

12. The apparatus of claim 1 wherein said means for adjustably positioning said bulkhead comprises pivot support means for said bulkhead, and a variable length strut member for pivotably and adjustably positioning said bulkhead.

13. A transmission testing apparatus comprising a frame member, at least one upright member disposed at an end of said frame member, said upright member having a shaft journalled therethrough and energy absorbing means driven by said shaft, an adjustably positionable bulkhead, a prime mover mounted on one side of said bulkhead, said prime mover having an output shaft, transmission support means attached to said bulkhead for affixing thereto a transmission to be tested, said transmission having an input shaft aligned with said prime mover output shaft for coupling to said prime mover output shaft and an output shaft, means for displaceably and adjustably supporting said bulkhead relative to said frame member for aligning said transmission output shaft with said shaft driving said energy absorbing means, and means for coupling said transmission output shaft to said shaft driving said energy absorbing means.

14. The apparatus of claim 13 further comprising a second upright member disposed at the other end of said frame member, said prime mover being mounted on said bulkhead between said bulkhead and said second upright member, a second shaft projecting from said second upright member, said second shaft being aligned with said shaft driving said energy absorbing means, and means for coupling said second shaft to a second output shaft of said transmission.

15. The apparatus of claim 14 wherein said second shaft projecting from said second upright member is held stationary.

16. The apparatus of claim 15 wherein said means for adjustably positioning said bulkhead comprises a cross-slide table.

17. The apparatus of claim 15 wherein said means for adjustably positioning said bulkhead comprises pivot support means for said bulkhead, and a variable length strut member for pivotably and adjustably positioning said bulkhead.

18. The apparatus of claim 14 wherein said second shaft projecting from said second upright member is rotatable, and further comprising second energy absorbing means driven by said second shaft.

19. The apparatus of claim 18 wherein said means for adjustably positioning said bulkhead comprises a cross-slide table.

20. The apparatus of claim 18 wherein said means for adjustably positioning said bulkhead comprises pivot support means for said bulkhead, and a variable length strut member for pivotably and adjustably positioning said bulkhead.

21. The apparatus of claim 14 wherein said means for adjustably positioning said bulkhead comprises a cross-slide table.

22. The apparatus of claim 14 wherein said means for adjustably positioning said bulkhead comprises pivot support means for said bulkhead, and a variable length strut member for pivotably and adjustably positioning said bulkhead.

23. The apparatus of claim 14 wherein said second energy absorbing means comprises energy storing means and energy restituting means.

24. The apparatus of claim 14 wherein said energy absorbing means each comprises energy storing means and energy restituting means.

25. The apparatus of claim 13 wherein said means for adjustably positioning said bulkhead comprises a cross-slide table.

26. The apparatus of claim 13 wherein said means for adjustably positioning said bulkhead comprises pivot support means for said bulkhead, and a variable length strut member for pivotably and adjustably positioning said bulkhead.

27. The apparatus of claim 13 wherein said energy absorbing means comprises energy storing means and energy restituting means.

* * * * *

UNITED STATES PATENT AND TRADEMARK OFFICE
CERTIFICATE OF CORRECTION

PATENT NO. : 4,520,659
DATED : June 4, 1985
INVENTOR(S) : Carroll J. Lucia and George Lucia It is certified that error appears in the above-identified patent and that said Letters Patent are hereby corrected as shown below:

Col. 4, line 47, change "it" to --It--;

Col. 5, line 23, after "said" (1st occurrence) insert --frame member--.

Signed and Sealed this

Twenty-second Day of October 1985

[SEAL]

Attest:

DONALD J. QUIGG

Attesting Officer

Commissioner of Patents and Trademarks—Designate